(12) United States Patent
Chang et al.

(10) Patent No.: US 10,156,729 B2
(45) Date of Patent: Dec. 18, 2018

(54) OPTICAL WAVELENGTH CONVERTER AND ILLUMINATION SYSTEM WITH SAME

(71) Applicant: DELTA ELECTRONICS, INC., Taoyuan Hsien (TW)

(72) Inventors: Keh-Su Chang, Taoyuan Hsien (TW); Yen-I Chou, Taoyuan Hsien (TW); Chi Chen, Taoyuan Hsien (TW); Meng-Han Liu, Taoyuan Hsien (TW); Jau-Shiu Chen, Taoyuan Hsien (TW)

(73) Assignee: DELTA ELECTRONICS, INC., Taoyuan Hsien (TW)

( * ) Notice: Subject to any disclaimer, the term of this patent is extended or adjusted under 35 U.S.C. 154(b) by 787 days.

(21) Appl. No.: 14/471,805

(22) Filed: Aug. 28, 2014

(65) Prior Publication Data

US 2015/0211693 A1    Jul. 30, 2015

(30) Foreign Application Priority Data

Jan. 29, 2014   (TW) .............................. 103103661 A

(51) Int. Cl.
| | |
|---|---|
| *F21V 9/40* | (2018.01) |
| *G02B 27/14* | (2006.01) |
| *F21V 9/30* | (2018.01) |
| *F21S 10/00* | (2006.01) |
| *F21V 9/16* | (2006.01) |
| *G02B 27/10* | (2006.01) |
| *G03B 21/20* | (2006.01) |
| *G03B 33/08* | (2006.01) |
| *G02B 26/00* | (2006.01) |

(Continued)

(52) U.S. Cl.
CPC .......... *G02B 27/141* (2013.01); *F21S 10/007* (2013.01); *F21V 9/16* (2013.01); *F21V 9/30* (2018.02); *G02B 27/1006* (2013.01); *G03B 21/204* (2013.01); *G03B 33/08* (2013.01); *F21Y 2115/10* (2016.08); *F21Y 2115/30* (2016.08); *G02B 26/008* (2013.01)

(58) Field of Classification Search
CPC ... G03B 21/204; G02B 26/008; H04N 9/3114
See application file for complete search history.

(56) References Cited

U.S. PATENT DOCUMENTS

| | | |
|---|---|---|
| 8,733,942 B2 | 5/2014 | Chang |
| 8,733,944 B2 | 5/2014 | Huang |

(Continued)

FOREIGN PATENT DOCUMENTS

| | | |
|---|---|---|
| CN | 102418905 | 4/2012 |
| CN | 102722034 A | 10/2012 |

(Continued)

*Primary Examiner* — Andrew Coughlin
(74) *Attorney, Agent, or Firm* — Kirton McConkie; Evan R. Witt

(57) ABSTRACT

An optical wavelength converter includes a first substrate, a first wavelength conversion material, and a second substrate. The first substrate has at least one first segment. The first wavelength conversion material is contained in the first segment for converting a first waveband light into a second waveband light. The second waveband light is reflected by the first segment. The second substrate is arranged beside the first substrate, and has at least one second segment. The first waveband light is transmitted through the second segment.

9 Claims, 13 Drawing Sheets

(51) Int. Cl.
    *F21Y 115/30*     (2016.01)
    *F21Y 115/10*     (2016.01)

(56) References Cited

U.S. PATENT DOCUMENTS

| | | | |
|---|---|---|---|
| 2007/0279779 A1* | 12/2007 | Milbourne | H04N 9/3114 359/892 |
| 2011/0007279 A1* | 1/2011 | Silverstein | G02B 26/008 353/8 |
| 2012/0162612 A1* | 6/2012 | Huang | G02B 5/20 353/31 |
| 2012/0201030 A1* | 8/2012 | Yuan | G02B 26/008 362/293 |
| 2012/0242912 A1* | 9/2012 | Kitano | H04N 9/3111 348/759 |
| 2013/0258639 A1 | 10/2013 | Hu et al. | |
| 2014/0204558 A1* | 7/2014 | Bartlett | G02B 26/008 362/84 |
| 2014/0253882 A1* | 9/2014 | King | G02B 26/008 353/31 |
| 2015/0116982 A1* | 4/2015 | Jao | G03B 21/2093 362/84 |

FOREIGN PATENT DOCUMENTS

| | | |
|---|---|---|
| JP | 2004333553 | 11/2004 |
| JP | 2011070882 | 4/2011 |
| JP | 2011075673 A | 4/2011 |
| JP | 2013178290 | 9/2013 |
| JP | 2013235756 | 11/2013 |
| TW | 201207546 | 2/2012 |
| TW | 201226769 | 7/2012 |

\* cited by examiner

OPTICAL WAVELENGTH CONVERTER AND ILLUMINATION SYSTEM WITH SAME

FIELD OF THE INVENTION

The present invention relates to an optical wavelength converter, and more particularly to an optical wavelength converter for providing a stable and high-quality light source. The present invention relates to an illumination system with the optical wavelength converter.

BACKGROUND OF THE INVENTION

An optical wavelength converter is an optical transducer that converts a light having a first wavelength into a color light having a second wavelength. Generally, the optical wavelength converter is applied to a spotlight, a car headlight, a monitor, a projector or other special illumination circumstances.

Conventionally, the optical wavelength converter has a phosphor wheel. When a laser light source emits a laser beam to excite a phosphor powder of the phosphor wheel, a color light with a different wavelength is produced. Moreover, as the phosphor wheel is driven to rotate by a motor, different color lights are sequentially produced according to a time sequence. During the high-power operation, the wavelength conversion efficiency of the phosphor wheel is enhanced, and the photoelectric conversion and the lumen output are increased. Consequently, the optical wavelength converter is used in the light source of the new generation projector in recent years.

FIG. 1A schematically illustrates the structure of a conventional optical wavelength converter. As shown in FIG. 1A, the conventional optical wavelength converter 1 is driven by a motor 2. A phosphor powder 4 is coated on a segment 30 of a substrate 3 of the conventional optical wavelength converter 1. Depending on the type of the substrate, the conventional optical wavelength converters are classified into a transmission-type optical wavelength converter and a reflection-type optical wavelength converter. FIG. 1B schematically illustrates the optical path of a conventional transmission-type optical wavelength converter. FIG. 1C schematically illustrates the optical path of a conventional reflection-type optical wavelength converter. As shown in FIG. 1B, the substrate 3 of the conventional transmission-type optical wavelength converter 1 is a glass plate. An incident light I1 is directly transmitted through the substrate 3 to excite the phosphor powder 4. Consequently, a color light O1 is produced. In this situation, the propagation direction of the incident light I1 and the propagation direction of the color light O1 are identical. As shown in FIG. 1C, the substrate 3 of the conventional reflection-type optical wavelength converter 1 is a glass mirror, a glossy aluminum plate or any other appropriate high-reflectivity plate. After the phosphor powder 4 is excited by an incident light I2, a color light O2 is reflected by the substrate 3. In this situation, the propagation direction of the incident light I2 and the propagation direction of the color light O2 are opposed to each other.

However, with the increasing demands on the luminance of the projector, the optical power of the laser light for exciting the phosphor powder is high. Consequently, the substrate of the conventional transmission-type optical wavelength converter is very hot. Under this circumstance, the wavelength conversion efficiency of the phosphor powder is reduced, and thus the overall output light is adversely affected. Due to these reasons, the reflection-type optical wavelength converter is the mainstream product in the market.

Nowadays, the cooperation of the blue laser beam and the reflection-type optical wavelength converter may be applied to the projector to produce various color lights. FIG. 2 schematically illustrates a conventional optical wavelength converter with a hollow portion. The optical wavelength converter 1 of FIG. 2 is applied to illumination system with a blue laser light source. The blue laser light source may emit a blue laser light. As shown in FIG. 2, the substrate 3 of the optical wavelength converter 1 has a hollow portion 31 for allowing the blue laser light to go through. By changing the area of the hollow portion 31, the proportion of the output blue light is adjustable. However, since the rotation of the optical wavelength converter 1 is driven by the motor 2, it is difficult to control the oscillation amount of the motor 2 under high rotation rate. In case that the diameter of the substrate 3 is larger, the unmatching between the blue laser speckle and the hollow portion 31 is increased, and the rotation of the optical wavelength converter 1 is more unbalanced. Under this circumstance, the intensity and the chroma of the output light are not stable, and the quality of the output light is deteriorated.

Therefore, there is a need of providing an optical wavelength converter for providing a stable and high-quality light source and providing an illumination system with the optical wavelength converter in order to overcome the above drawbacks.

SUMMARY OF THE INVENTION

The present invention provides an optical wavelength converter and an illumination system with the optical wavelength converter in order to overcome the above-mentioned drawbacks encountered by the prior arts.

The present invention provides an optical wavelength converter and an illumination system with the optical wavelength converter. Due to the arrangement of a second substrate, the laser speckle can be uniformly and stably transmitted through the optical wavelength converter, and the balanced rotation of the optical wavelength converter can be effectively achieved. Consequently, the optical wavelength converter may be effectively and precisely controlled, and the unmatching of the blue speckle will be minimized. Under this circumstance, the intensity and the chroma of the output light are more stable, and the quality of the output light is enhanced.

The present invention provides an optical wavelength converter and an illumination system with the optical wavelength converter. Since the first segments of the first substrate and the second segments of the second substrate are alternately arranged, the balanced rotation of the optical wavelength converter is optimized. Consequently, the problem of causing deviation or vibration of the optical wavelength converter is overcome, and the light output is more stable.

In accordance with an aspect of the present invention, there is provided an optical wavelength converter. The optical wavelength converter includes a first substrate, a first wavelength conversion material, and a second substrate. The first substrate has at least one first segment. The first wavelength conversion material is contained in the first segment for converting a first waveband light into a second waveband light. The second waveband light is reflected by the first segment. The second substrate is arranged beside the first substrate, and has at least one second segment. The at least one first segment and the at least one second segment are alternately arranged. The first waveband light is transmitted through the second segment.

In accordance with another aspect of the present invention, there is provided an illumination system. The illumination system includes a solid-state light-emitting element and an optical wavelength converter. The solid-state light-emitting element emits a first waveband light. The optical wavelength converter includes a first substrate, a first wavelength conversion material, and a second substrate. The first substrate has at least one first segment. The first wavelength conversion material is contained in the first segment for converting the first waveband light into a second waveband light. The second waveband light is reflected by the first segment and propagated along a first optical path. The second substrate is arranged beside the first substrate, and has at least one second segment. The at least one first segment and the at least one second segment are alternately arranged. The first waveband light is transmitted through the second segment and propagated along a second optical path.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1A:
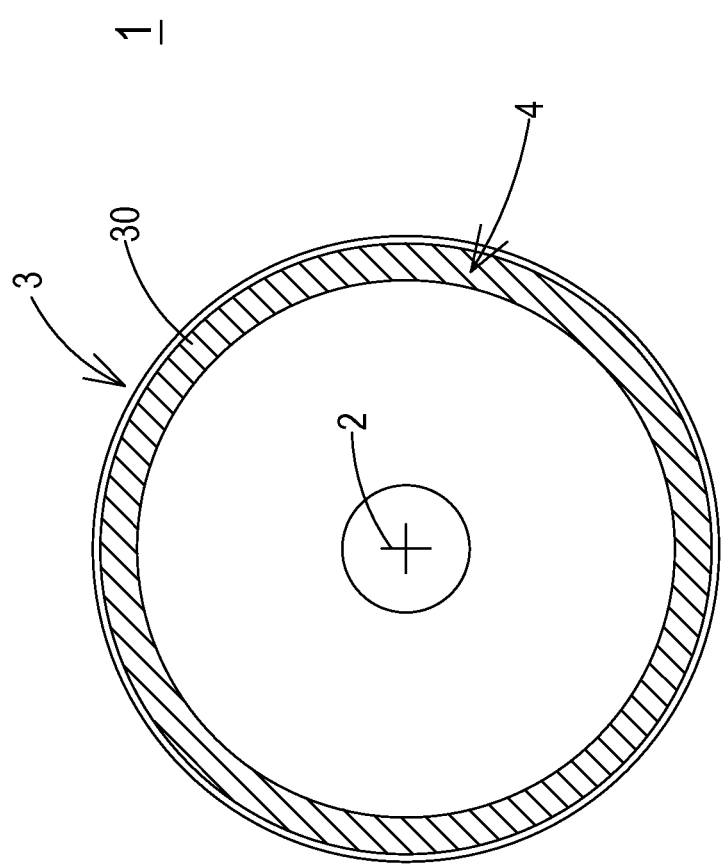
FIG. 1A schematically illustrates the structure of a conventional optical wavelength converter.
Figure 1B:
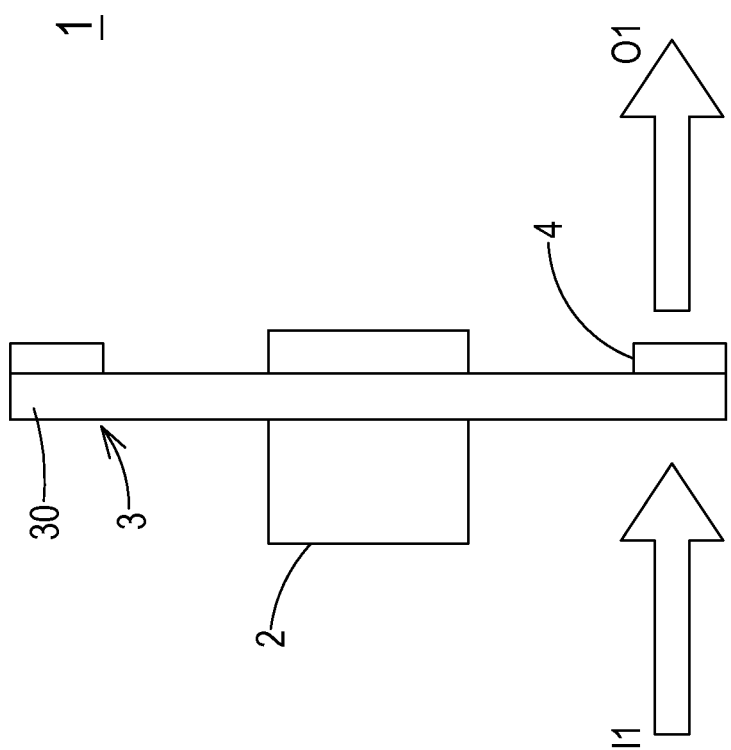
FIG. 1B schematically illustrates the optical path of a conventional transmission-type optical wavelength converter.
Figure 1C:
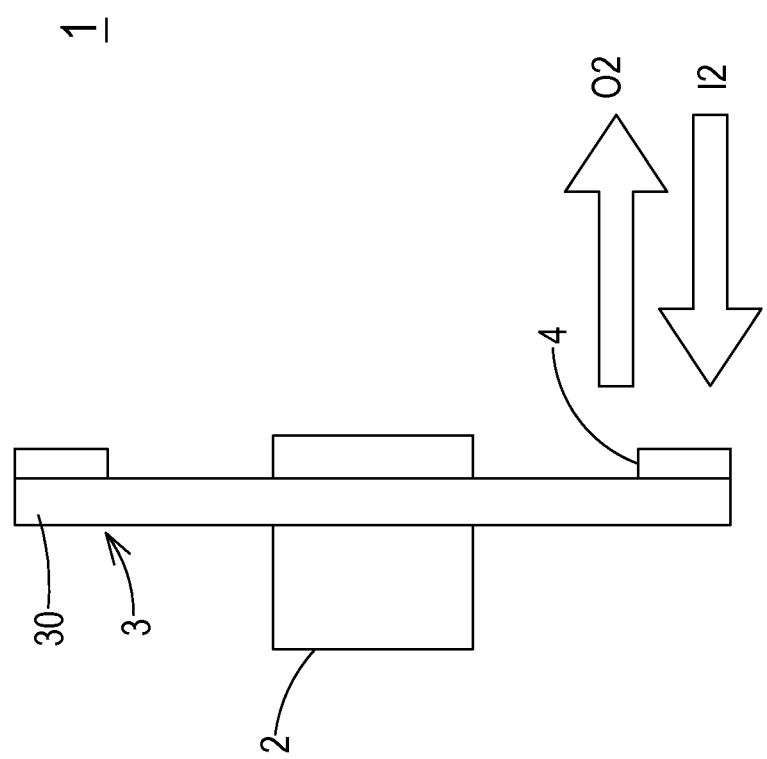
FIG. 1C schematically illustrates the optical path of a conventional reflection-type optical wavelength converter.
Figure 2:
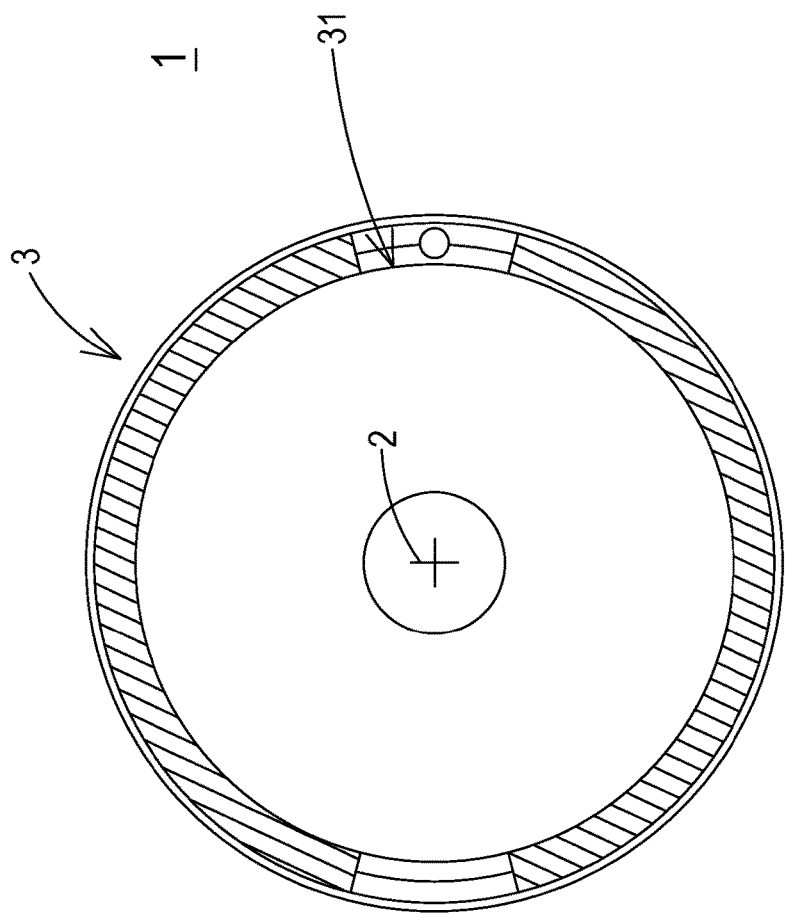
FIG. 2 schematically illustrates a conventional optical wavelength converter with a hollow portion.
Figure 3A:
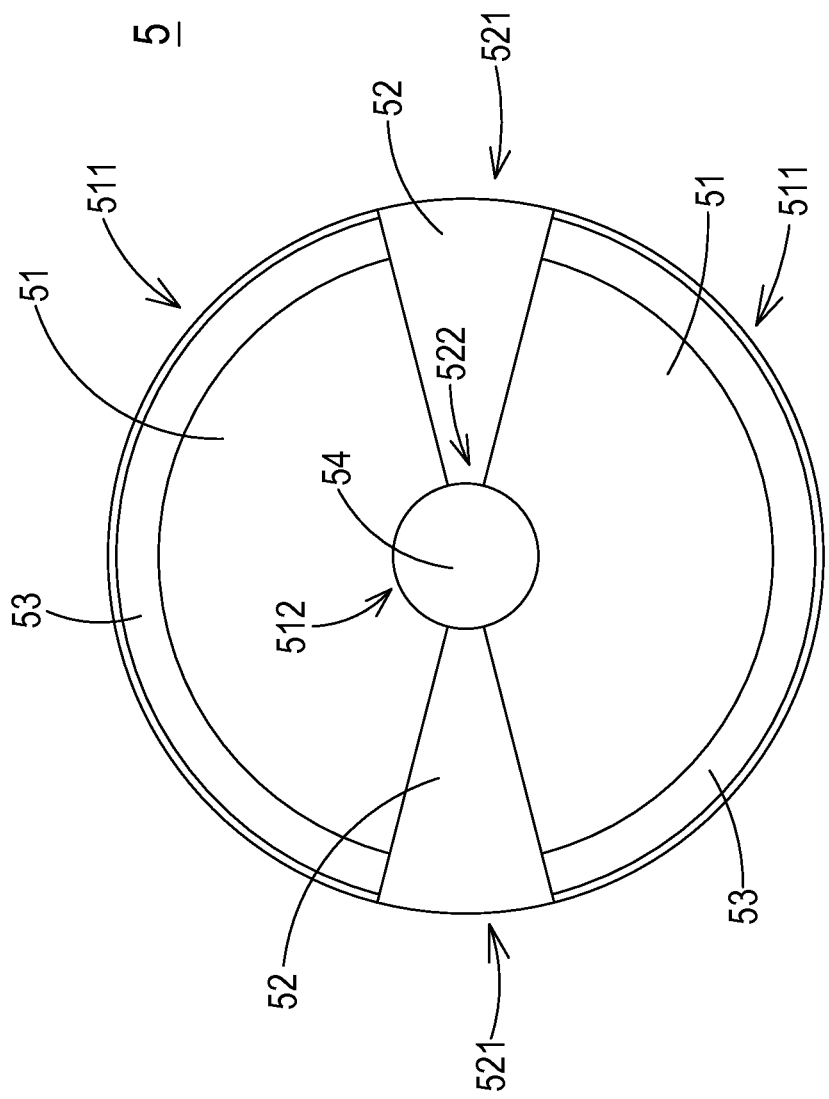
FIG. 3A schematically illustrates the structure of an optical wavelength converter according to a first embodiment of the present invention.
Figure 3B:
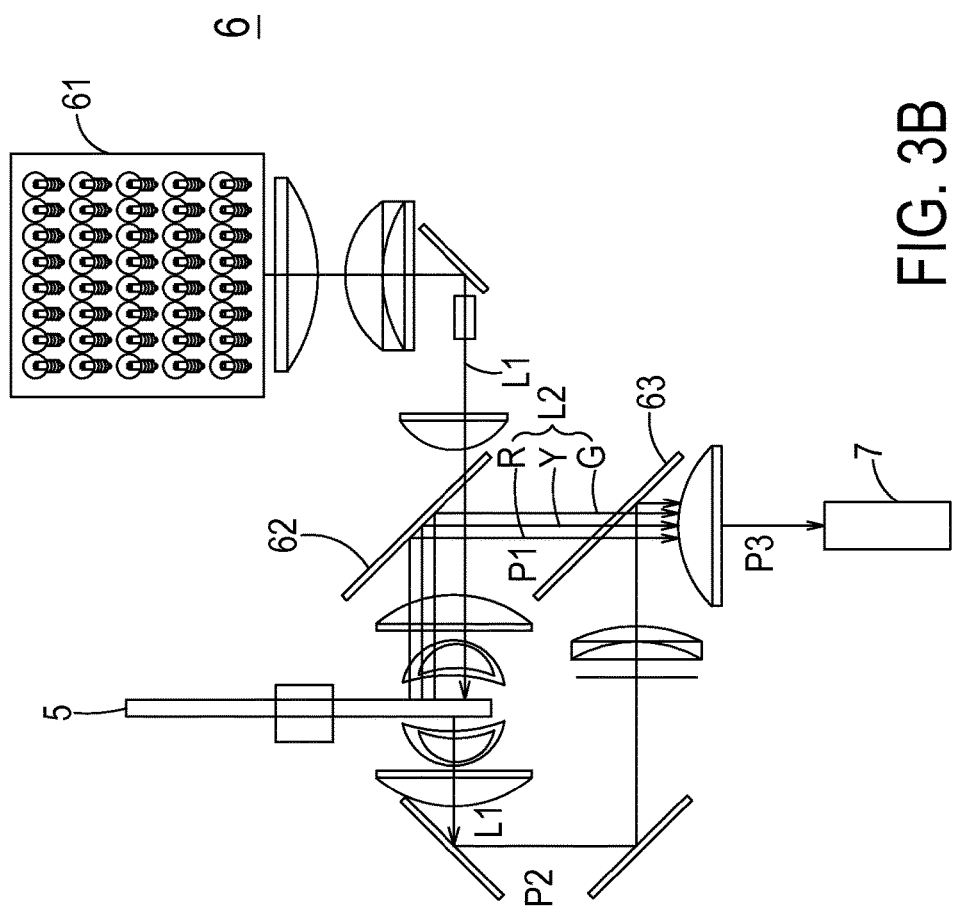
FIG. 3B schematically illustrates the architecture of an illumination system with the optical wavelength converter of FIG. 3A.

FIG. 3A schematically illustrates the structure of an optical wavelength converter according to a first embodiment of the present invention. FIG. 3B schematically illustrates the architecture of an illumination system with the optical wavelength converter of FIG. 3A. The optical wavelength converter 5 is applied to the illumination system 6. The illumination system 6 has a solid-state light-emitting element 61 for emitting a first waveband light L1. An example of the optical wavelength converter 5 includes but is not limited to a phosphor wheel. In this embodiment, the optical wavelength converter 5 comprises a first substrate 51, a second substrate 52, and a first wavelength conversion material 53. The first substrate 51 comprises at least one first segment 511. The first wavelength conversion material 53 is contained in the first segment 511 for converting the first waveband light L1 into a second waveband light L2. The second waveband light L2 is reflected by the first segment 511 and propagated along a first optical path P1. The second substrate 52 is located beside the first substrate 51. Moreover, the second substrate 52 comprises at least one second segment 521. In this embodiment, the first substrate 51 comprises plural first segments 511, and the second substrate 52 comprises plural second segments 521. The plural first segments 511 and the plural second segments 521 are alternately arranged. The first waveband light L1 is transmissible through the second segment 521 and propagated along a second optical path P2. In other words, during rotation of the optical wavelength converter 5, the first waveband light L1 is transmitted through the second segment 521 and propagated along the second optical path P2, or the second waveband light L2 converted from the first waveband light L1 is reflected by the first segment 511 and propagated along the first optical path P1. Consequently, the first waveband light L1 and the second waveband light L2 are alternately projected out. Moreover, due to the arrangement of the second substrate 52, the laser speckle can be uniformly and stably transmitted through the optical wavelength converter 5. Consequently, the optical wavelength converter 5 may be effectively and precisely controlled, and the unmatching of the blue speckle will be minimized. Under this circumstance, the intensity and the chroma of the output light are more stable, and the quality of the output light is enhanced.

In this embodiment, each first segment 511 is arranged between two adjacent second segments 521, or each second segment 521 is arranged between two adjacent first segments 511. Moreover, the first substrate 51 and the second substrate 52 are made of different materials. For example, the first substrate 51 is an aluminum plate, and the second substrate 52 is a glass plate. The first substrate 51 and the second substrate 52 are combined as a wheel-type main body. In other words, the overall central angle of the first segments 511 of the first substrate 51 and the second segments 521 of the second substrate 52 is 360 degrees. In some embodiments, the first substrate 51 further comprises a first supporting part 512, and the second substrate 52 further comprises a second supporting part 522. Preferably, the first supporting part 512 is located at a center of mass of the first substrate 51, and the second supporting part 522 is located at a center of mass of the second substrate 52. It is noted that the locations of the first supporting part 512 and the second supporting part 522 are not restricted. In addition, the optical wavelength converter 5 further comprises a fixing element 54. The first supporting part 512 and the second supporting part 522 are connected with and fixed on the fixing element 54 by a clamping means or an adhering means. Consequently, the first substrate 51 and the second substrate 52 may be coaxially rotated with the fixing element 54.

The thickness of the first substrate 51 and the thickness of the second substrate 52 may be identical or different. Moreover, both of the thickness of the first substrate 51 and the thickness of the second substrate 52 are in the range between 0.1 mm and 2 mm. The thickness of the first substrate 51 and the thickness of the second substrate 52 are selected to achieve stable rotation of the first substrate 51 and the second substrate 52.

Please refer to FIGS. 3A and 3B again. The illumination system 6 comprises the solid-state light-emitting element 61 and the optical wavelength converter 5. The solid-state light-emitting element 61 is used for emitting the first waveband light L1. The optical wavelength converter 5 comprises the first substrate 51, the second substrate 52, and the first wavelength conversion material 53. The first substrate 51 comprises the at least one first segment 511. The second substrate 52 comprises the at least one second segment 521. The first wavelength conversion material 53 is contained in the first segment 511 for converting the first waveband light L1 into a second waveband light L2. The second waveband light L2 is reflected by the first segment 511 and propagated along the first optical path P1. The first waveband light L1 is transmitted through the second segment 521 of the second substrate 52 (e.g. a glass plate) and propagated along the second optical path P2. In this embodiment, the first segment 511 of the first substrate 51 is a glossy metal plate or a matte metal plate. The surface spread half-angle of the first substrate 51 is in the range between 0 degree and 80 degrees. The reflectivity of the first substrate 51 is large than 85% with respect to the wavelength range between 400 nm and 700 nm. In this embodiment, the second substrate 52 (including the second segment 521) is a glass plate or a diffusion glass plate. The surface spread half-angle of the second substrate 52 is in the range between 0 degree and 80 degrees. Consequently, the first waveband light L1 can be uniformly and stably transmitted through the second substrate 52. It is noted that numerous modifications and alterations may be made while retaining the teachings of the invention.

In an embodiment, the first waveband light L1 is a blue light. The first wavelength conversion material 53 contains at least one phosphor powder (e.g. two types of phosphor powders) for converting the first waveband light L1 into a red light R and a green light G. In another embodiment, the first wavelength conversion material 53 contains a single type of phosphor agent for converting the first waveband light L1 into a yellow light Y, which is a mixed light of a red light R and a green light G. That is, the first waveband light L1 is the blue light, and the second waveband light L2 is the red light R, the green light G or the green light Y. Moreover, in the illumination system 6, the first waveband light L1 along the second optical path P2 and the second waveband light L2 along the first optical path P1 are mixed to produce a mixed light along a third optical path P3. The mixed light is sent to an optical engine 7 in order to be further projected out. Consequently, the illumination system 6 is capable of projecting three primary color lights (i.e. the blue light, the red light and the green light) or projecting the three primary color lights and the yellow light. Preferably, these color lights are sequentially projected.

Figure 4:
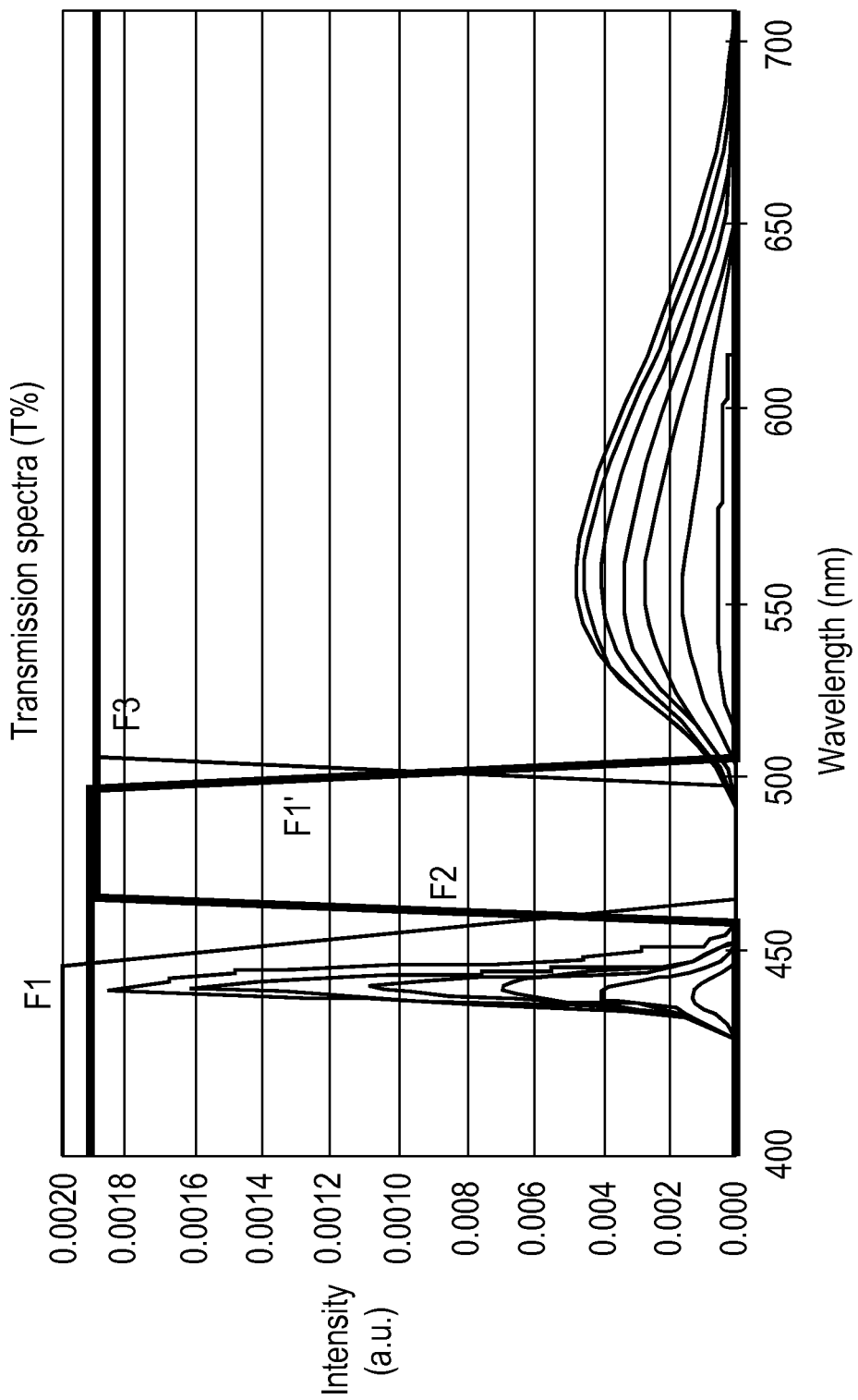
FIG. 4 schematically illustrates the transmission spectra of the illumination system of FIG. 3B.

FIG. 4 schematically illustrates the transmission spectra of the illumination system of FIG. 3B. Please refer to FIGS. 3A, 3B and 4. Along the first optical path P1, the illumination system comprises a first dichroic mirror 62 and a second dichroic mirror 63. The first dichroic mirror 62 is arranged between the solid-state light-emitting element 61 and the optical wavelength converter 5. The first dichroic mirror 62 has a transmission spectrum F1 as shown in FIG. 4. The transmission spectrum F1 indicates that the light with the wavelength higher than 460 nm is reflected by the first dichroic mirror 62 but the light with the wavelength lower than 460 nm is transmitted through the first dichroic mirror 62. Consequently, the first waveband light L1 is transmitted through the first dichroic mirror 62, and the second waveband light L2 is reflected by the first dichroic mirror 62. The second dichroic mirror 63 is arranged between the first dichroic mirror 62 and the optical engine 7. That is, the second dichroic mirror 63 is arranged between the first optical path P1 and the third optical path P3 and arranged between the second optical path P2 and the third optical path P3. The first waveband light L1 along the second optical path P2 and the second waveband light L2 along the first optical path P1 are mixed to produce the mixed light along the third optical path P3. The second dichroic mirror 63 has a transmission spectrum F2 as shown in FIG. 4. The transmission spectrum F2 indicates that the light with the wavelength higher than 460 nm is transmitted through the second dichroic mirror 63 but the light with the wavelength lower than 460 nm is reflected by the second dichroic mirror 63. Consequently, the first waveband light L1 is reflected by the second dichroic mirror 63, and the second waveband light L2 is transmitted through the second dichroic mirror 63. In this embodiment, the first waveband light L1 is a blue light, and the second waveband light L2 is a visible light having the wavelength higher than 460 nm.

In some other embodiments, the second substrate 52 of the optical wavelength converter 5 has optical functions or optical properties. For example, the second substrate 52 is an optical attenuator or a filter. For example, in case that the second substrate 52 is the optical attenuator or the filter and the wavelength of the first waveband light L1 emitted by the solid-state light-emitting element 61 is 445 nm, the purple blue color of the first waveband light L1 is adjusted to the standard Rec.709 blue chromaticity coordinate (0.15, 0.06). In some other embodiments, the second substrate 52 is an optical attenuator with an optical density (OD) in the range between 1 and 2. The uses of the optical attenuator or the filter as the second substrate 52 will be illustrated as follows.

Figure 5A:
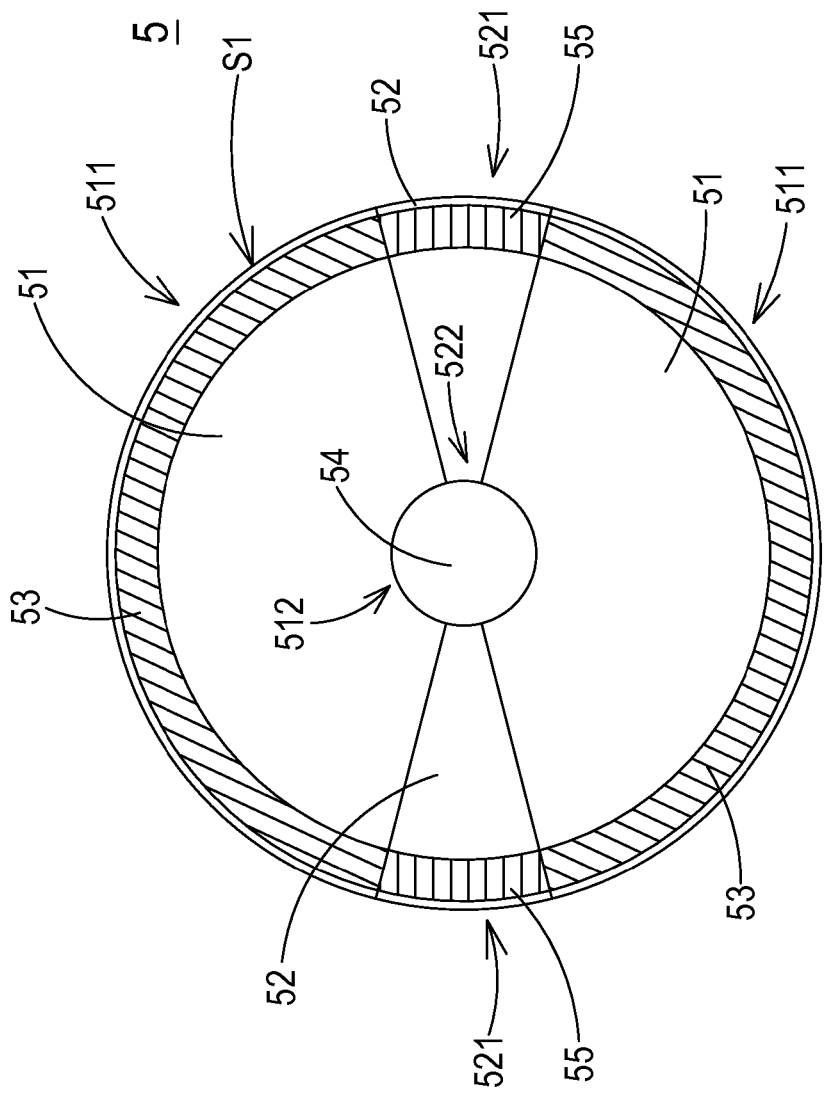
FIG. 5A schematically illustrates the structure of an optical wavelength converter according to a second embodiment of the present invention.
Figure 5B:
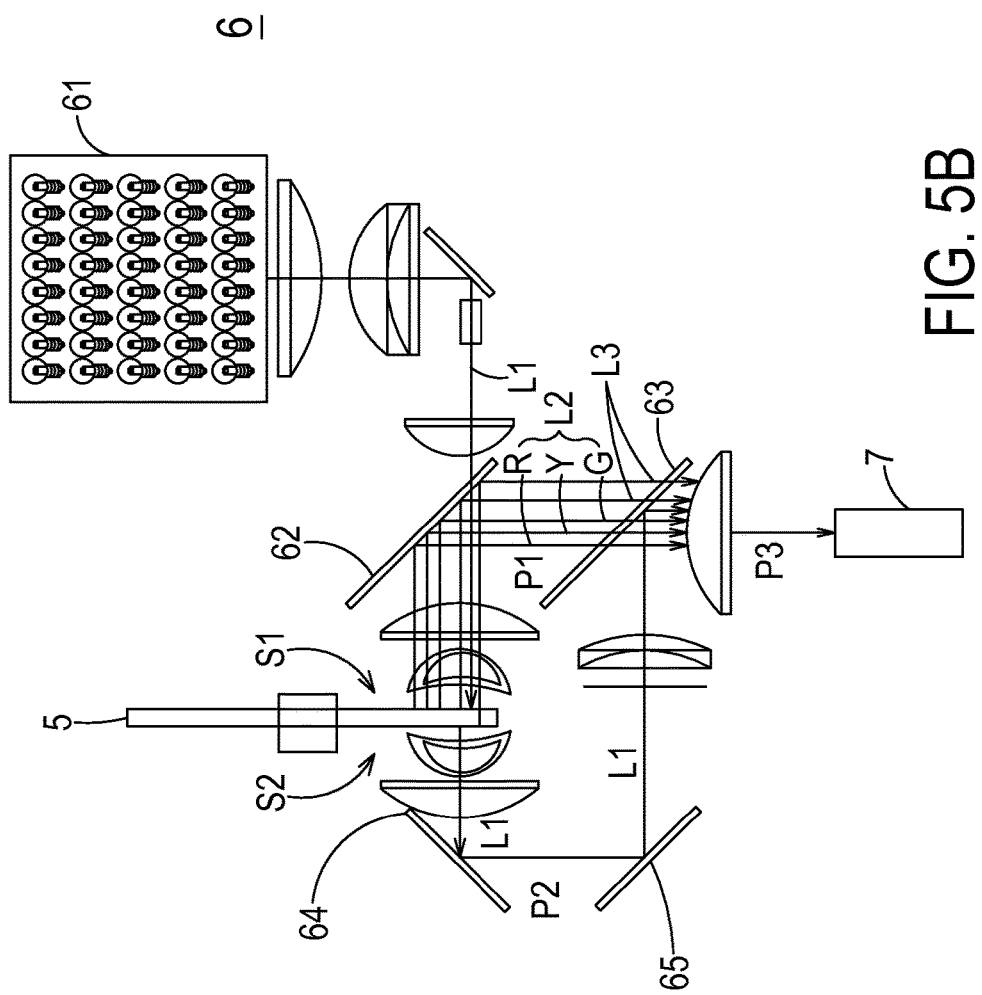
FIG. 5B schematically illustrates the architecture of an illumination system with the optical wavelength converter of FIG. 5A.

FIG. 5A schematically illustrates the structure of an optical wavelength converter according to a second embodiment of the present invention. FIG. 5B schematically illustrates the architecture of an illumination system with the optical wavelength converter of FIG. 5A. The optical wavelength converter 5 is applied to the illumination system 6. The illumination system 6 has a solid-state light-emitting element 61 for emitting a first waveband light L1. An example of the optical wavelength converter 5 includes but is not limited to a phosphor wheel. In this embodiment, the optical wavelength converter 5 comprises a first substrate 51, a second substrate 52, a first wavelength conversion material 53, and a second wavelength conversion material 55. The illumination system further comprises a first dichroic mirror 62, a second dichroic mirror 63, a first reflection mirror 64, and a second reflection mirror 65. The first reflection mirror 64 and the second reflection mirror 65 are arranged sequentially along the second optical path P2 and arranged between the optical wavelength converter 5 and the second dichroic mirror 63 along the second optical path P2. The first waveband light L1 is reflected by the first reflection mirror 64 and the second reflection mirror 65. The functions of the first substrate 51 of the optical wavelength converter 5 and the first wavelength conversion material 53 are similar to those of the first embodiment, and are not redundantly described herein.

In this embodiment, the solid-state light-emitting element 61 is a laser element, and the wavelength of the first waveband light L1 emitted by the solid-state light-emitting element 61 is 445 nm. That is, the first waveband light L1 is a purple blue color light. Moreover, the optical wavelength converter 5 further comprises a second wavelength conversion material 55. The second wavelength conversion material 55 is contained in the second segment 521 of the second substrate 52. By the second wavelength conversion material 55, a portion of the first waveband light L1 is converted into a third waveband light L3. The wavelength of the third waveband light L3 is in the range between 460 nm and 520 nm, and the peak value is 490 nm (i.e. a cyan color light).

In this embodiment, the second substrate 52 is an optical attenuator or a filter, the solid-state light-emitting element 61 is a laser element, and the wavelength of the first waveband light L1 emitted by the solid-state light-emitting element 61 is 445 nm. Moreover, the second wavelength conversion material 55 is a cyan phosphor powder. When the cyan phosphor powder is excited by the first waveband light L1, a third waveband light L3 with a peak value of 490 nm is produced. The third waveband light L3 may be used for color adjustment. Moreover, in this embodiment, the third waveband light L3 is propagated along the first optical path P1. That is, the color light with a wavelength lower than 460 nm is permitted to be transmitted through the second substrate 52. Moreover, in the illumination system 6, the first waveband light L1, the second waveband light L2 and the third waveband light L3 are mixed to produce a mixed light along a third optical path P3. The mixed light is sent to an optical engine 7 in order to be further projected out. Alternatively, in some other embodiments, the third waveband light L3 may be propagated along the second optical path P2.

In case that the second substrate 52 is a filter, the transmission spectrum of the second substrate 52 is similar to the transmission spectrum F1 as shown in FIG. 4. That is, the transmittance of the second substrate 52 with respect to the light having the wavelength lower than 460 nm is at least 85%, but the transmittance of the second substrate 52 with respect to the light having the wavelength higher than 460 nm is at most 1%. The third waveband light L3 is propagated along the first optical path P1, reflected by the first dichroic mirror 62 and transmitted through the second dichroic mirror 63. The first dichroic mirror 62 has the transmission spectrum F1 as shown in FIG. 4. The transmission spectrum F1 indicates that the light with the wavelength lower than 460 nm is transmitted through the first dichroic mirror 62. The second dichroic mirror 63 has a transmission spectrum F2 as shown in FIG. 4. The transmission spectrum F2 indicates that the light with the wavelength higher than 460 nm is transmitted through the second dichroic mirror 63.

The portion of the first waveband light L1 transmitted through the second substrate 52 is propagated along the second optical path P2. Along the second optical path P2, the first waveband light L1 is sequentially reflected by the first reflection mirror 64 and the second reflection mirror 65. The first waveband light L1 with the wavelength lower than 460 nm is reflected by the second dichroic mirror 63. The first waveband light L1, the second waveband light L2 and the third waveband light L3 are mixed to produce a mixed light along the third optical path P3. The mixed light is sent to an optical engine 7 in order to be further projected out. Consequently, the purple blue color of the first waveband light L1 is adjusted to the standard Rec.709 blue chromaticity coordinate.

Figure 6A:
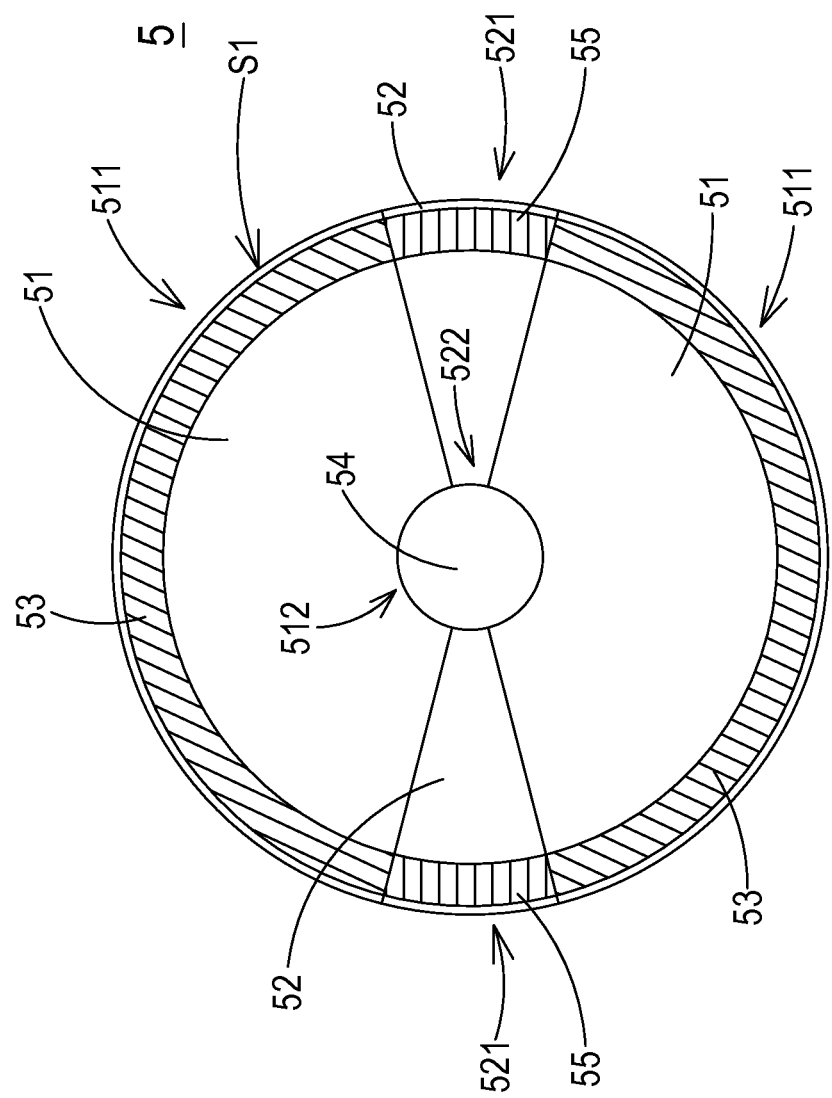
FIG. 6A schematically illustrates the structure of an optical wavelength converter according to a third embodiment of the present invention.
Figure 6B:
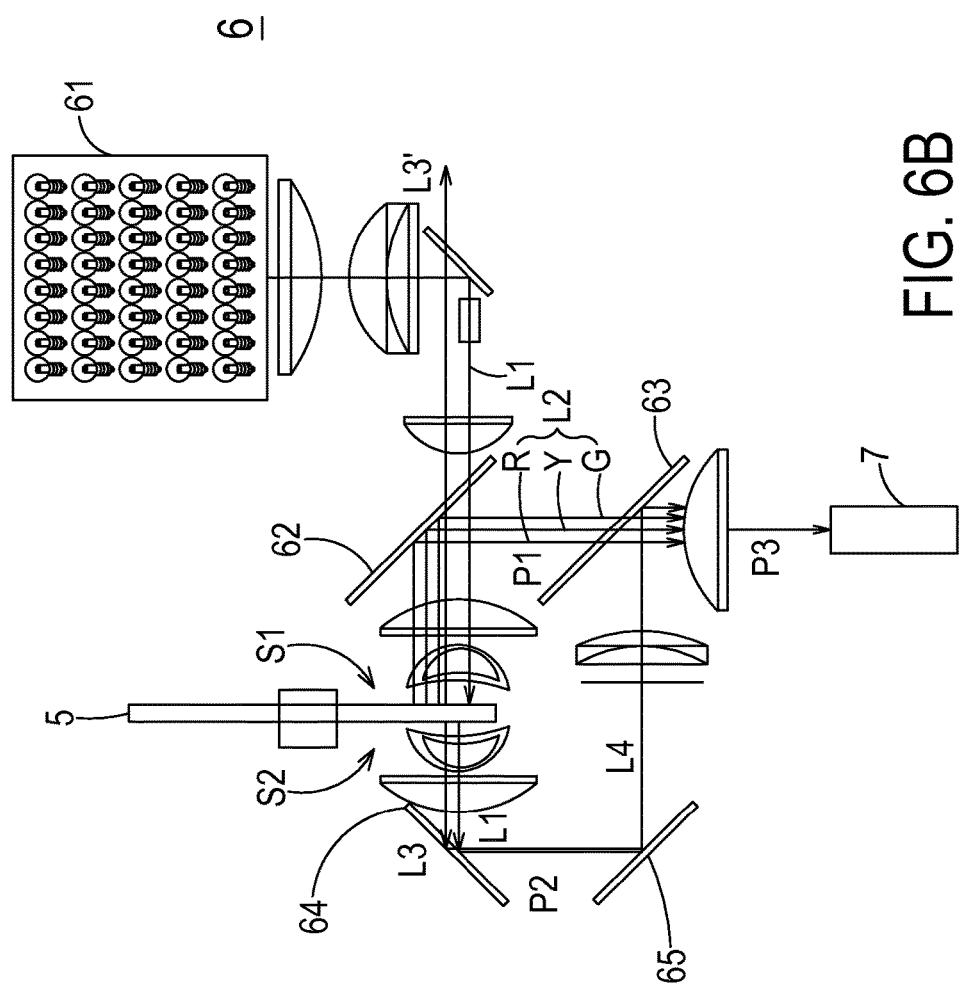
FIG. 6B schematically illustrates the architecture of an illumination system with the optical wavelength converter of FIG. 6A.

FIG. 6A schematically illustrates the structure of an optical wavelength converter according to a third embodiment of the present invention. FIG. 6B schematically illustrates the architecture of an illumination system with the optical wavelength converter of FIG. 6A. The optical wavelength converter 5 is applied to the illumination system 6. The illumination system 6 has a solid-state light-emitting element 61 for emitting a first waveband light L1. An example of the optical wavelength converter 5 includes but is not limited to a phosphor wheel. In this embodiment, the optical wavelength converter 5 comprises a first substrate 51, a second substrate 52, a first wavelength conversion material 53, and a second wavelength conversion material 55. The illumination system further comprises a first dichroic mirror 62, a second dichroic mirror 63, a first reflection mirror 64, and a second reflection mirror 65. The functions of the solid-state light-emitting element 61, the first dichroic mirror 62, the second dichroic mirror 63, the first reflection mirror 64 and the second reflection mirror 65 are similar to those of the second embodiment, and are not redundantly described herein. In comparison with the second embodiment, the third waveband light L3 is propagated along the second optical path P2, and the color light with the wavelength lower than 500 nm is transmissible through the second substrate 52. In case that the second substrate 52 is a filter, the second substrate 52 has a transmission spectrum F1' as shown in FIG. 4. That is, the transmittance of the second substrate 52 with respect to the light having the wavelength lower than 500 nm is at least 85%, but the transmittance of the second substrate 52 with respect to the light having the wavelength higher than 500 nm is at most 1%. When the second wavelength conversion material 55 is excited by the first waveband light L1, a third waveband light L3 is produced. The third waveband light L3 and portion of the first waveband light L1 transmitted through the second substrate 52 are combined as a fourth waveband light L4 and propagated along the second optical path P2. The fourth waveband light L4 is sequentially reflected by the first reflection mirror 64 and the second reflection mirror 65. The first waveband light L1, the second waveband light L2 and the fourth waveband light L4 are mixed to produce a mixed light along the third optical path P3. The second dichroic mirror 63 has a transmission spectrum F3 as shown in FIG. 4. The transmission spectrum F3 indicates that the light with the wavelength lower than 500 nm is reflected by the second dichroic mirror 63.

Since the second substrate 52 is an optical attenuator or a filter, a portion of the third waveband light L3 (e.g. the third waveband light L3' with a wavelength lower than 500 nm) is propagated to the first dichroic mirror 62 along the first optical path P1. That is, the first dichroic mirror 62 also has a transmission spectrum F1' as shown in FIG. 4. Consequently, the first waveband light L1 and the third waveband light L3 with the wavelength lower than 500 nm are transmitted through the first dichroic mirror 62, so that the third waveband light L3' with a wavelength lower than 500 nm isn't propagated along the first optical path P1 to mix with the first waveband light L1.

In this embodiment, the second wavelength conversion material 55 is contained in the second segment 521 of the second substrate 52. By the second wavelength conversion material 55, the first waveband light L1 is converted into the third waveband light L3. The third waveband light L3 is propagated along the first optical path P1 and the second optical path P2. In the third optical path P3, the first waveband light L1 and the third waveband light L3 are mixed with each other, and thus the color of the first waveband light L1 is adjusted. That is, the purple blue color of the first waveband light L1 is adjusted to be close to the pure blue color. Moreover, since the third waveband light L3 is transmissible through the second substrate 52, the second wavelength conversion material 55 may be coated on a first surface S1 of the second segment 521 of the second substrate 52 or a second surface S2 (e.g. backside) of the second segment 521 of the second substrate 52.

Figure 7A:
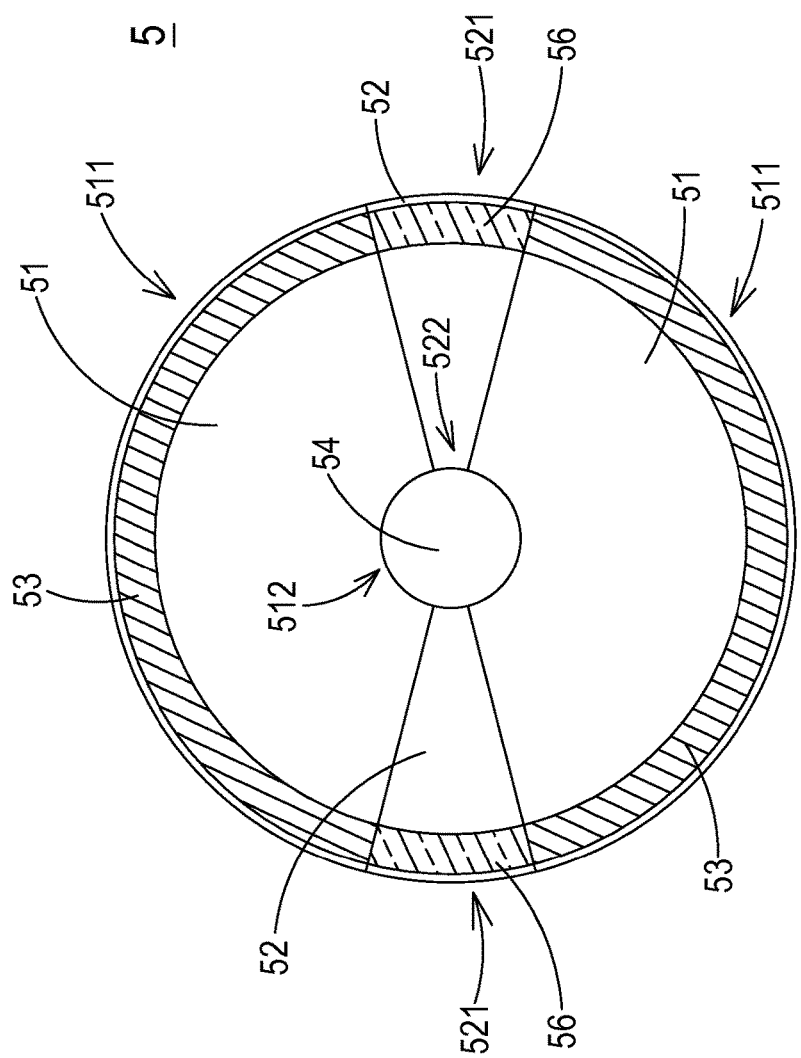
FIG. 7A schematically illustrates the structure of an optical wavelength converter according to a fourth embodiment of the present invention.
Figure 7B:
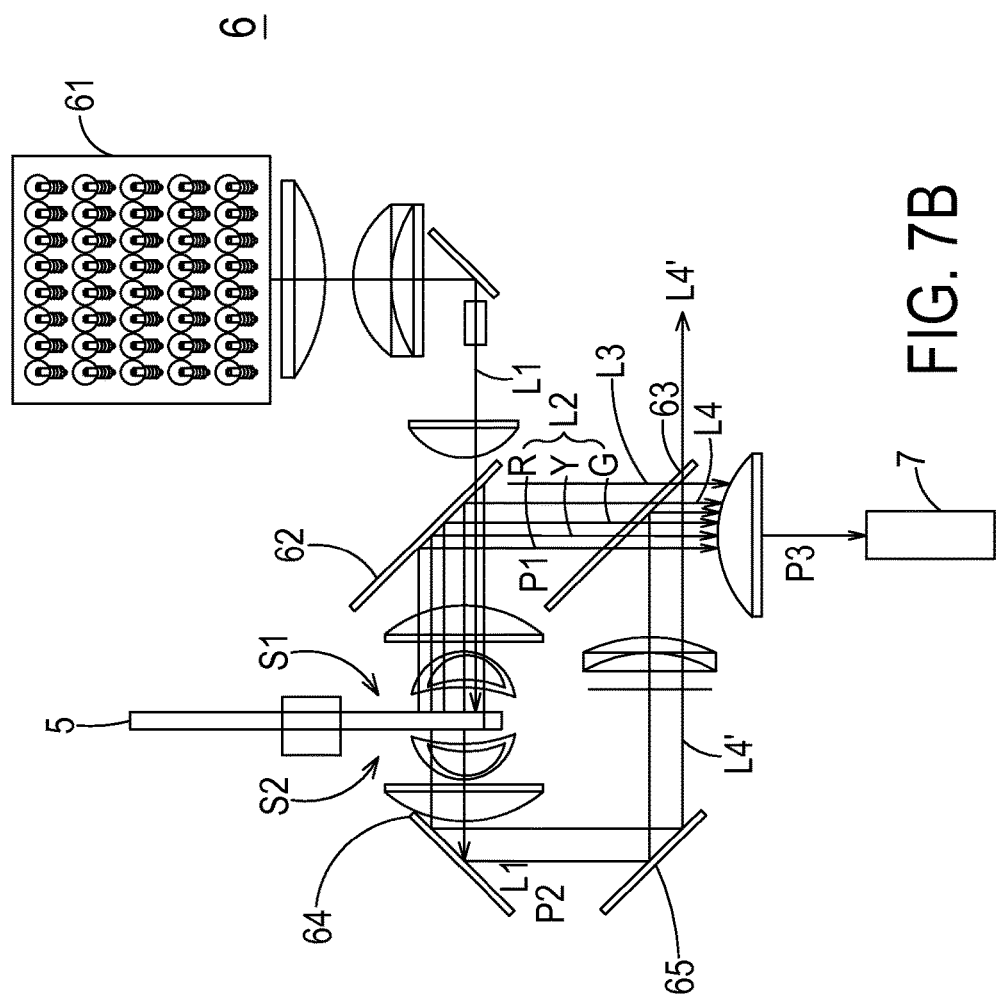
FIG. 7B schematically illustrates the architecture of an illumination system with the optical wavelength converter of FIG. 7A.

FIG. 7A schematically illustrates the structure of an optical wavelength converter according to a fourth embodiment of the present invention. FIG. 7B schematically illustrates the architecture of an illumination system with the optical wavelength converter of FIG. 7A. The optical wavelength converter 5 is applied to the illumination system 6. The illumination system 6 has a solid-state light-emitting element 61 for emitting a first waveband light L1. An example of the optical wavelength converter 5 includes but is not limited to a phosphor wheel. The illumination system further comprises a first dichroic mirror 62, a second dichroic mirror 63, a first reflection mirror 64, and a second reflection mirror 65. The functions of the solid-state light-emitting element 61, the first dichroic mirror 62, the second dichroic mirror 63, the first reflection mirror 64 and the second reflection mirror 65 are similar to those of the second embodiment, and are not redundantly described herein. In this embodiment, the optical wavelength converter 5 comprises a first substrate 51, a second substrate 52, a first wavelength conversion material 53, and a third wavelength conversion material 56. The third wavelength conversion material 56 is coated on a second surface S2 of the second segment 521 of the second substrate 52. By the third wavelength conversion material 56, the first waveband light L1 is converted into a fourth waveband light L4. The fourth waveband light L4 is a green light with a wavelength in the range between 470 nm and 530 nm.

Since the fourth waveband light L4 (green light) contains a portion of the cyan light, the transmission spectrum of the second substrate is a combination of the transmission spectrum F1 and the transmission spectrum F3 as shown in FIG. 4. That is, the transmittance of the second substrate 52 with respect to the light having the wavelength lower than 460 nm and the light with the wavelength higher than 500 nm is at least 85%, but the transmittance of the second substrate 52 with respect to the light having the wavelength in the range between 460 nm and 500 nm is at most 1%. Consequently, the portion of the fourth waveband light L4 (e.g. the fourth waveband light L4' with a wavelength in the range between 500 nm and 530 m) is reflected by the second substrate 52, and the portion of the fourth waveband light L4 in the range between 470 nm and 500 nm is transmitted through the second substrate 52 and propagated to the first optical path P1. The first dichroic mirror 62 has the transmission spectrum F1 as shown in FIG. 4. The portion of the fourth waveband light L4 in the range between 470 nm and 500 nm is reflected by the first dichroic mirror 62, and then transmitted through the second dichroic mirror 63. The first waveband light L1 along the second optical path P2 and the second waveband light L2 along the first optical path P1 are mixed to produce the mixed light along the third optical path P3. It is preferred that the third wavelength conversion material 56 is coated on the second surface S2 (e.g. the backside) of the second segment 521 of the second substrate 52.

In particular, after the first waveband light L1 is converted into the fourth waveband light L4 by the third wavelength conversion material 56, the portion of the fourth waveband light L4 in the range between 470 nm and 500 nm is transmitted through the second substrate 52 and propagated to the first optical path P1, and the rest of the fourth waveband light L4 (i.e. the fourth waveband light L4' with a wavelength in the range between 500 nm and 530 m) is reflected by the second substrate 52 and propagated along the second optical path P2. Along the second optical path P2, the first waveband light L1 and the fourth waveband light L4' are sequentially reflected by first reflection mirror 64 and the second reflection mirror 65. The second dichroic mirror 63 has a transmission spectrum F2 as shown in FIG. 4. The transmission spectrum F2 indicates that the light with the wavelength higher than 460 nm is transmitted through the second dichroic mirror 63 but the light with the wavelength lower than 460 nm is reflected by the second dichroic mirror 63. Consequently, the fourth waveband light L4' is transmitted through the second dichroic mirror 63, and is not propagated along the third optical path P3. In other words, the third wavelength conversion material 56 is coated on a second surface S2 of the second segment 521 of the second substrate 52. By the third wavelength conversion material 56, the first waveband light L1 is converted into a fourth waveband light L4. The fourth waveband light L4 is a green light with a wavelength in the range between 470 nm and 530 nm. The portion of the fourth waveband light L4 in the range between 470 nm and 500 nm is propagated to the first optical path P1. The first waveband light L1, the second waveband light L2 and the fourth waveband light L4 in the range between 470 nm and 500 nm are mixed to produce the mixed light along the third optical path P3. Consequently, the color of the first waveband light L1 is adjusted. That is, the purple blue color of the first waveband light L1 is adjusted to be close to the pure blue color.

From the above descriptions, the present invention provides the optical wavelength converter and the illumination system with the optical wavelength converter. Due to the arrangement of the second substrate, the laser speckle can be uniformly and stably transmitted through the optical wavelength converter. Consequently, the optical wavelength converter may be effectively and precisely controlled, and the unmatching of the blue speckle will be minimized. Under this circumstance, the intensity and the chroma of the output light are more stable, and the quality of the output light is enhanced. Moreover, since the first segments of the first substrate and the second segments of the second substrate are alternately arranged, the balanced rotation of the optical wavelength converter is optimized. Consequently, the problem of causing deviation or vibration of the optical wavelength converter, the light output is more stable. Moreover, an additional wavelength conversion material may be contained in the second segment of the second substrate. When the wavelength conversion material is excited by the first waveband light, the third waveband light is produced. The first waveband light and the third waveband light are mixed or combined with each other. Moreover, the solid-state light-emitting element may emit the non-pure color light in order to comply with various requirements of the optical engine.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An optical wavelength converter, comprising:
    a first substrate having at least one first segment;
    a first wavelength conversion material contained in the first segment for converting a first waveband light into a second waveband light, wherein the second waveband light is reflected by the first segment;
    a second substrate arranged beside the first substrate, and having at least one second segment, wherein the second substrate is a diffusion glass plate, a surface spread half-angle of the second substrate is in a range between 0 degree and 80 degrees, the at least one first segment and the at least one second segment are alternately arranged, and the first waveband light is transmitted through the second segment, and wherein the first substrate and the second substrate are made of different materials, and the first substrate and the second substrate are combined as a wheel-type main body; and
    a fixing element, wherein the first substrate comprises a first supporting part, and the second substrate comprises a second supporting part, wherein the first supporting part and the second supporting part are connected with and fixed on the fixing element, and wherein the second segment is directly connected with and extended from the second supporting part.

2. The optical wavelength converter according to claim 1, wherein an overall central angle of the first segment of the first substrate and the second segment of the second substrate is 360 degrees.

3. The optical wavelength converter according to claim 1, wherein the first substrate comprises plural first segments, the second substrate comprises plural second segments, and the plural first segments and the plural second segments are alternately arranged, wherein each first segment is arranged between two adjacent second segments, or each second segment is arranged between two adjacent first segments.

4. The optical wavelength converter according to claim 1, wherein a thickness of the first substrate and a thickness of the second substrate are identical or different, wherein each of the thickness of the first substrate and the thickness of the second substrate is in a range between 0.1 mm and 2 mm.

5. The optical wavelength converter according to claim 1, wherein the first substrate is a glossy metal plate or a matte metal plate, wherein a surface spread half-angle of the first substrate is in a range between 0 degree and 80 degrees, and a reflectivity of the first substrate is large than 85% with respect to a wavelength range between 400 nm and 700 nm.

6. The optical wavelength converter according to claim 1, further comprising a second wavelength conversion material, wherein the second wavelength conversion material is contained in the second segment of the second substrate for converting the first waveband light into a third waveband light, wherein the third waveband light is a cyan color light having a wavelength in a range between 460 nm and 520 nm and a peak value at 490 nm.

7. The optical wavelength converter according to claim 6, wherein the second wavelength conversion material is coated on a first surface or a second surface of the second segment.

8. The optical wavelength converter according to claim 1, further comprising a third wavelength conversion material, wherein the third wavelength conversion material is coated on a first surface or a second surface of the second segment for converting the first waveband light into a fourth waveband light, wherein the fourth waveband light is a green light having a wavelength in a range between 470 nm and 530 nm.

9. The optical wavelength converter according to claim 8, wherein a portion of the fourth waveband light having a wavelength in a range between 470 nm and 500 nm is mixed with the first waveband light.

\* \* \* \* \*